(12) United States Patent
Marshall et al.

(10) Patent No.: US 10,023,327 B2
(45) Date of Patent: Jul. 17, 2018

(54) SMALL SCALE REACTION WHEEL ASSEMBLIES

(71) Applicant: HONEYWELL INTERNATIONAL INC., Morris Plains, NJ (US)

(72) Inventors: Terence Marshall, Glendale, AZ (US); Paul Buchele, Glendale, AZ (US); Pietro Dileonardo, Glendale, AZ (US); James T. Hanks, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 198 days.

(21) Appl. No.: 15/139,602

(22) Filed: Apr. 27, 2016

(65) Prior Publication Data

US 2017/0313445 A1 Nov. 2, 2017

(51) Int. Cl.
| | | |
|---|---|---|
| *F16F 15/30* | (2006.01) | |
| *B64G 1/28* | (2006.01) | |
| *F16F 15/315* | (2006.01) | |
| *G01C 19/18* | (2006.01) | |

(52) U.S. Cl.
CPC .............. *B64G 1/283* (2013.01); *F16F 15/30* (2013.01); *F16F 15/3156* (2013.01); *G01C 19/18* (2013.01)

(58) Field of Classification Search
CPC ...... B64G 1/283; F16F 15/30; F16F 15/3156; G01C 19/18
See application file for complete search history.

(56) References Cited

U.S. PATENT DOCUMENTS

| | | |
|---|---|---|
| 3,142,184 A | 7/1964 | East et al. |
| 3,517,562 A | 6/1970 | Houghton et al. |
| 3,529,477 A | 9/1970 | Quermann |
| 3,702,569 A | 11/1972 | Quinn et al. |
| 3,897,985 A | 8/1975 | Davis et al. |
| 4,193,646 A | 3/1980 | Rockl et al. |
| 4,838,099 A | 6/1989 | Quermann |
| 4,868,434 A | 9/1989 | Hayashi |
| 4,916,957 A | 4/1990 | Quermann |

(Continued)

FOREIGN PATENT DOCUMENTS

JP 2007100901 A 4/2007

OTHER PUBLICATIONS

Extended EP Search Report for Application No. 17163710.1-1754.

*Primary Examiner* — Justin M Benedik
(74) *Attorney, Agent, or Firm* — Lorenz & Kopf, LLP (57) ABSTRACT

Reaction wheel assemblies having relatively compact and lightweight form factors (referred to as "small scale" RWAs) are disclosed. Such small scale RWAs are well-suited for deployment onboard relatively small satellites, but are not restricted to usage within any particular device or platform. In one embodiment, the small scale RWA includes a primary support platform to which a rotor is coupled for rotation about a spin axis. An axially-expanded face-to-face (DF) duplex bearing pair is disposed between the rotor shaft and the support platform. The DF duplex bearing pair includes first and second rolling element bearings positioned around an intermediate portion of the rotor shaft. The first and second rolling element bearings have first and second bearing load lines, respectively, which are spaced by a tailored bearing load line separation (SLL).

19 Claims, 4 Drawing Sheets (56) References Cited

U.S. PATENT DOCUMENTS

| | | | |
|---|---|---|---|
| 4,969,754 A * | 11/1990 | Rohrer | D01H 4/12 |
| | | | 384/512 |
| 5,723,923 A | 3/1998 | Clagett | |
| 5,873,285 A * | 2/1999 | Barnes | B64G 1/283 |
| | | | 74/572.21 |
| 7,365,504 B2 | 4/2008 | Kroger | |
| 8,026,647 B2 | 9/2011 | Seo | |
| 9,148,037 B2 | 9/2015 | Kalev et al. | |
| 2011/0314958 A1 * | 12/2011 | Rogers | B64G 1/283 |
| | | | 74/574.4 |
| 2012/0031224 A1 | 2/2012 | Tarrant | |
| 2015/0367966 A1 * | 12/2015 | Judd | B64G 1/363 |
| | | | 701/13 |
| 2016/0010991 A1 * | 1/2016 | Marshall | G01C 19/16 |
| | | | 74/5.37 |

\* cited by examiner

SMALL SCALE REACTION WHEEL ASSEMBLIES

TECHNICAL FIELD

The present invention relates generally to momentum control devices and, more particularly, to small scale reaction wheel assemblies well-suited for deployment onboard relatively small satellites.

BACKGROUND

Reaction Wheel Assemblies (RWAs) are routinely deployed onboard satellites and other vehicles for attitude adjustment purposes. By common design, an RWA contains a rotor including a rotor shaft, which is fixedly joined to an inertial element (e.g., an outer rim or ring) by way of a suspension web. The rotor is typically mounted within a housing assembly having upper and lower halves, which are sealingly joined to enclose the rotor. The opposing ends of the rotor shaft are received within cylindrical cavities or bores provided in the RWA housing assembly. Spin bearings, such as duplex pair ball bearings, are positioned around the opposing shaft ends to produce a rotor suspension, which generally limits freedom of rotor motion relative to the housing in all directions except for rotation about a spin axis. During operation of the RWA, a spin motor drives rotation of the rotor about a spin axis at a relatively high rate of speed to create momentum. When it is desired to adjust the attitude of the host vehicle, control circuitry commands the spin motor to alter the rotational speed of the rotor and, therefore, the momentum of the RWA. Due to this change in momentum, a controlled output torque is generated, which is transferred from the RWA to the host vehicle to effectuate the desired attitude adjustment.

As satellites increase in number and decrease in size, a demand has arisen for increasingly compact, lightweight, relatively low cost, and readily manufacturable RWAs adapted for deployment onboard so-called "small satellites" or, more simply, "smallsats." Although a universal definition is yet to be established, a satellite weighing less than 400 kilograms is often considered a "small satellite." Small satellites include, for example, miniaturized cube-shaped research and communication satellites commonly referred to as "cubesats." The torque output requirements of a particular RWA may be eased when deployed onboard a small satellite; however, most, if not all of the remaining design requirements of the RWA become increasingly stringent in the small satellite environment. Part count, weight, size, power requirements, complexity, and the like are all desirably minimized when an RWA is designed for usage onboard a small satellite. At the same time, any such "small scale" RWA (that is, an RWA having a reduced size and weight as compared to conventional RWAs) is also ideally structurally robust, highly reliable, and capable of being manufactured in an efficient, cost effective manner. The following describes small scale RWAs that satisfy such competing criteria.

BRIEF SUMMARY

Reaction wheel assemblies having relatively compact and lightweight form factors (referred to as "small scale" RWAs) are disclosed. Such small scale RWAs are well-suited for deployment onboard relatively small satellites, but are not restricted to usage within any particular device or platform. In one embodiment, the small scale RWA includes a primary support platform to which an RWA rotor is coupled for rotation about a spin axis. An axially-expanded face-to-face (DF) duplex bearing pair is disposed between the rotor shaft and the primary support platform to facilitate rotation of the RWA rotor about the spin axis. The DF duplex bearing pair includes first and second rolling element bearings, such as ball bearings, which are each positioned around the rotor shaft. The first and second rolling element bearings have first and second bearing load lines, respectively, which are spaced by a bearing load line separation ($S_{LL}$). The bearing load line separation ($S_{LL}$) is determined by an axial spacing between the rolling element rows of the rolling element bearings ($S_A$) and by the rolling element/race contact angles ($\beta$). By adjusting these parameters, the bearing load line separation ($S_{LL}$) may impart the DF duplex bearing pair with an optimized angular stiffness tailored to best suit the physical and operational characteristics of the RWA, such as rotor mass and mode frequencies.

In another embodiment, the small scale RWA includes a housing assembly, a rotor, and a face-to-face (DF) duplex bearing pair. The rotor includes, in turn, a rotor shaft, a rotor rim, and a center of gravity ($CG_{ROTOR}$). The rotor is contained within or otherwise coupled to the housing assembly for rotation about a spin axis. The DF duplex bearing pair disposed around the rotor shaft and circumscribes or surrounds $CG_{ROTOR}$. In one implementation, the axial center of the DF duplex bearing is located substantially at or is substantially coincident with $CG_{ROTOR}$. In certain embodiments, the housing assembly includes a central tubular structure containing the DF duplex bearing pair and into which the rotor shaft extends. Additionally, the rotor rim may circumscribe at least a portion of the central tubular structure and the DF duplex bearing pair. In still further embodiments, the RWA may also include a spin motor having a motor rotor and motor stator. The motor rotor may be mounted to the rotor rim, while the motor stator is mounted to the housing assembly at a location outboard of the central tubular structure.

In a still further embodiment, the small scale RWA includes a primary support platform, a DF duplex bearing pair, and a rotor mounted to the primary support platform for rotation about a spin axis. The primary support platform includes, in turn, an inner tubular sidewall defining a central chamber within the RWA. The rotor includes a rotor rim circumscribing the inner tubular sidewall, as well as a rotor shaft joined to the rotor rim and extending into the central chamber. The DF duplex bearing pair is disposed between the rotor shaft and the inner tubular sidewall and retained within the central chamber. In certain embodiments, the RWA further includes a spin motor, which is at least partially nested within the rotor. The spin motor contains a motor rotor mounted to an interior portion of the rotor rim, as well as a motor stator mounted to the primary support platform. In such embodiments, the motor stator and the motor rim may collectively form an inertial system having a center of gravity $CG_{SYSTEM}$ located within the DF duplex bearing pair.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

Embodiments of a small scale Reaction Wheel Assembly (RWA) having a relatively compact and lightweight form factor are provided. The small scale RWA features a unique, centralized bearing architecture, which contains a single axially-expanded, face-to-face (DF) duplex bearing pair disposed around a shaft of the RWA rotor. The axially-expanded DF duplex bearing pair includes first and second rolling element (e.g., ball) bearings, which each containing an annular row of rolling elements. The DF duplex bearing pair is "axially-expanded" or "split" in the sense that the two row of rolling elements are separated by a predetermined axial spacing ($S_A$), as taken along the spin axis. The axial spacing between the rolling element rows ($S_A$) and the rolling element/race contact angles ($\beta$) are tailored, by design, to create a desired bearing load line separation ($S_{LL}$) between the respective bearing load lines of the rolling element bearings. The bearing load line separation (SLL) is, in turn, selected to impart the RWA with increased angular rotor stability and an improved moment capacity to better accommodate radial disturbance forces, while utilizing a single DF duplex bearing pair to support the rotor shaft. Additionally, the axially-expanded nature of the DF duplex bearing pair promotes uniform bearing loading to further prolong bearing life. As a further benefit, overall RWA reliability is enhanced by eliminating other rolling element bearings (e.g., a second duplex bearing pair), which otherwise increase the number of potential failure points within the RWA package. In certain embodiments, the axially-expanded duplex bearing pair is at least partially nested within the spin motor, which is, in turn, at least partially nested within the RWA rotor. Such a highly nested design further contributes to the lightweight, axially-compact form factor of the RWA. The end result is a small scale RWA that is both structurally robust and reliable, while further having a reduced part count, complexity, weight, envelope, and cost of manufacture as compared to conventional RWAs. A non-limiting exemplary embodiment of the small scale RWA will now be described in conjunction with FIGS. 1-4.

Figure 1:
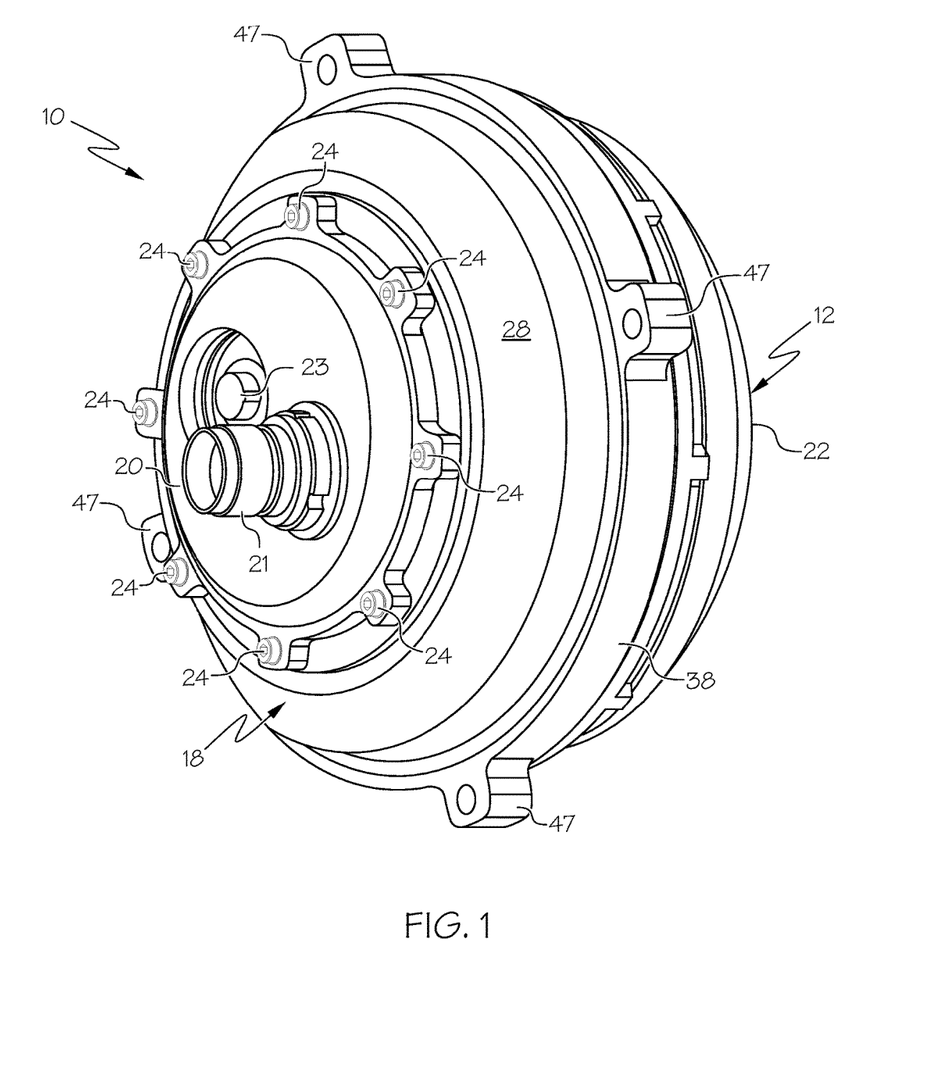
FIGS. 1, 2, and 3 are isometric, exploded, and cross-sectional views, respectively, of a small scale Reaction Wheel Assembly (RWA) well-suited for deployment onboard a small satellite, as illustrated in accordance with an exemplary embodiment of the present invention.
Figure 2:
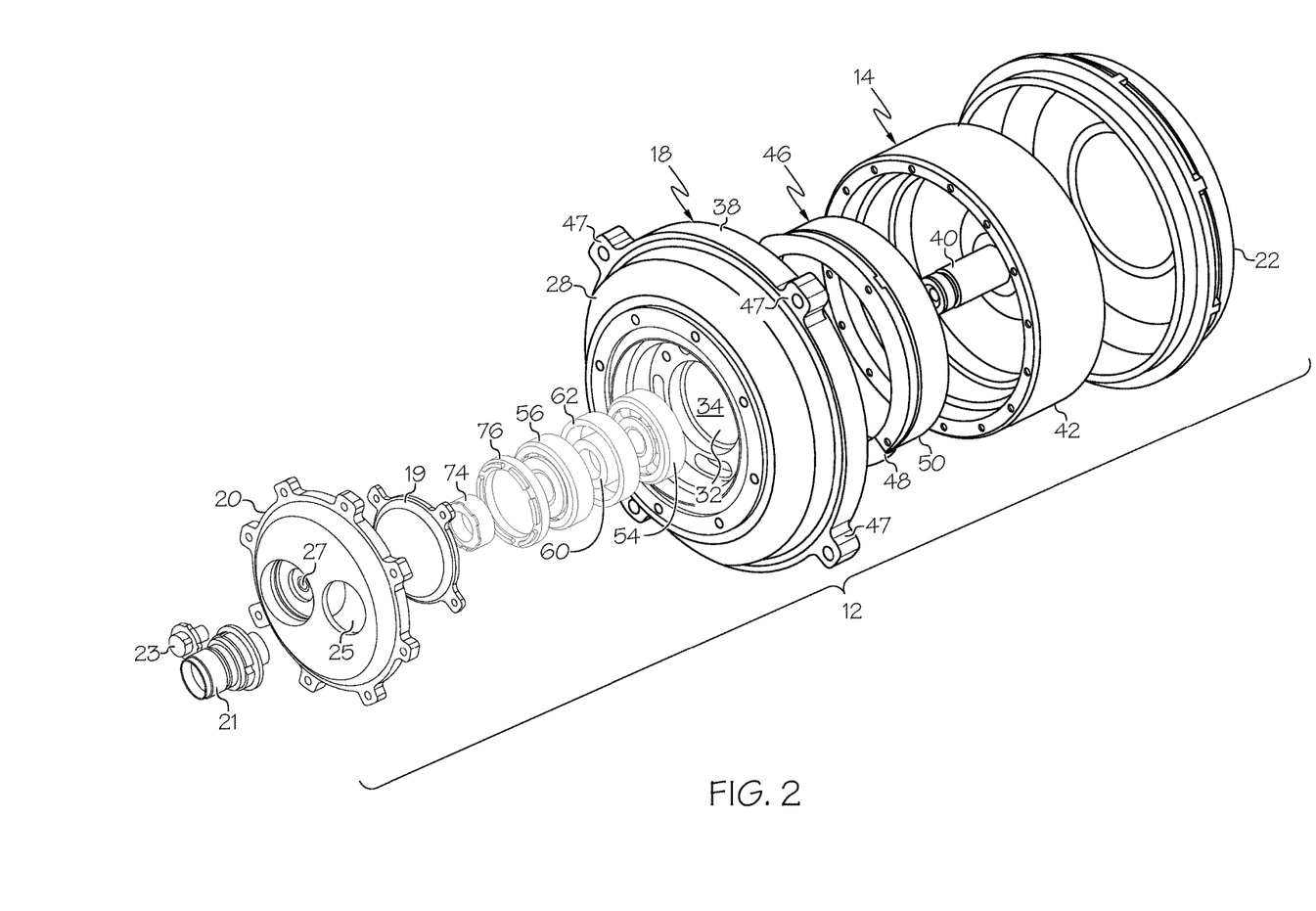
Figure 3:
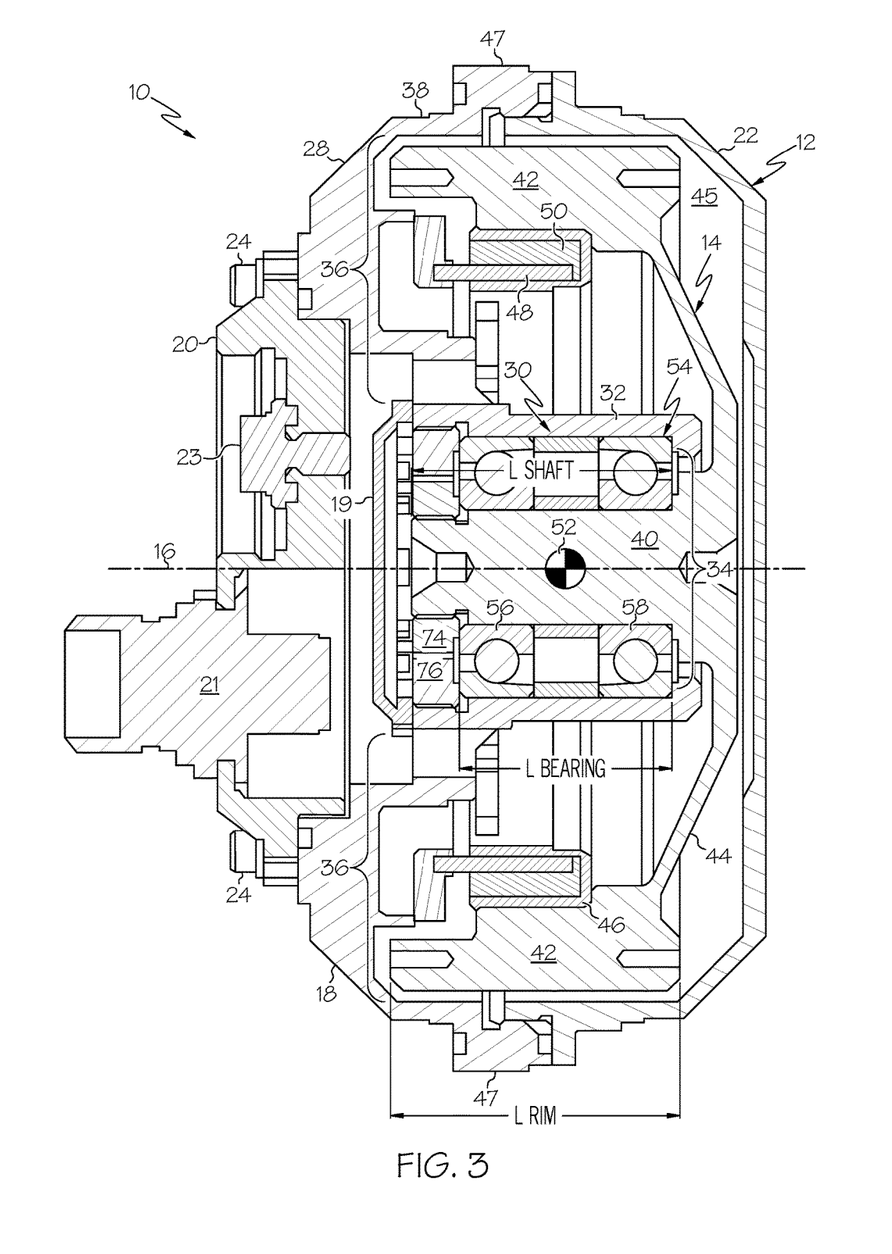

FIGS. 1, 2, and 3 are isometric, exploded, and cross-sectional views, respectively, of a small scale RWA 10, as illustrated in accordance with an exemplary embodiment of the present invention. RWA 10 includes a housing assembly 12 and a RWA rotor 14 (FIG. 2-3), which is mounted within housing assembly 12 for rotation about a spin axis 16 (identified in FIG. 3). Housing assembly 12 includes, in turn, a primary support platform 18, an inner bearing cover 19 (shown in FIGS. 2-3), an end cap 20, and a rotor cover 22. Bearing cap 19 (FIGS. 2-3) is affixed to first side of primary support platform 18 utilizing a plurality of bolts or other fasteners (hidden from view). Similarly, end cap 20 is positioned over bearing cover 19 and also affixed to the first side of primary support platform 18 utilizing bolts 24 (FIGS. 1 and 3). Opposite end cap 20, rotor cover 22 is affixed to a second, opposing side of platform 18 utilizing a second plurality of bolts (also hidden from view). An electrical connector 21 and a threaded plug 23 are mounted through end cap 20 and accessible from the exterior of RWA 10. Specifically, electrical connector 21 is disposed through a first opening 25 (identified in FIG. 2) provided in end cap 20 to allow an electrical connection to the electrical components contained within housing assembly 12 including spin motor 46 (described below). Threaded plug 23 is sealingly disposed over a vacuum port 27 (FIG. 2) to allow the evacuation of housing assembly 12 in embodiments wherein assembly 12 encloses a hermetically-sealed rotor cavity or chamber.

In further embodiments, housing assembly 12 can include a different number of components joined together utilizing any combination of fasteners, welding, threaded attachment, and other joinder techniques. For example, bearing cover 19, end cap 20, and rotor cover 22 are non-essential to the operation of RWA 10 and may be eliminated in certain embodiments. In such embodiments, RWA 10 will still typically include primary support platform 18 or another structure (whether a single piece or assembled from multiple pieces) serving as a mechanical plant or structurally robust chassis, which is suitable for supporting rotor 14 and the other internal components of RWA 10. As shown in FIGS. 1-3, however, bearing cover 20 and rotor cover 22 are usefully provided to enclose and protect the internal components of RWA 10. Additionally, as indicated above, bearing cover 20 and rotor cover 22 may be sealingly joined to primary support platform 18 to allow a partial vacuum to be drawn within RWA 10 for terrestrial testing purposes. Threaded plug 23 and vacuum port 27 may also be eliminated in embodiments wherein housing assembly 12 is not hermetically sealed or does not fully enclose rotor 14 (FIGS. 2-3).

Primary support platform 18 includes a radially-extending wall or diaphragm 28 and a centralized bearing containment structure 30 (identified in FIG. 2). Bearing contaminant structure 30 projects from radially-extending diaphragm 28 in an axial direction; the term "axial direction," as appearing in this document, defined as a direction parallel to spin axis 16 (FIG. 2). Centralized bearing containment structure 30 features an inner tubular sidewall 32, which defines or circumferentially bounds an inner cylindrical cavity or central bearing compartment 34. Inner tubular sidewall 32 further bounds the inner circumference of an annular cavity or recess 36 provided within primary support platform 18 (identified in FIG. 3). Annular recess 36 is further bound along its outer circumference by an outer annular sidewall 38, which extends around or circumscribes the outer periphery of radially-extending diaphragm 28. When RWA 10 is assembled, outer annular sidewall 38 helps to enclose rotor 14 and provides an annular interface for attachment of rotor cover 22. In alternative embodiments wherein RWA 10 lacks rotor cover 22, outer annular sidewall 38 may be eliminated. More generally, the shape, construction, and composition of primary support platform 18 can vary amongst embodiments. As indicated in FIGS. 1-3, primary support platform 18 is usefully formed as a single, machined piece composed of a relatively lightweight metal or alloy. This is not necessary, however, and support platform 18 may be assembled from two or more pieces in further embodiments of RWA 10.

As shown most clearly in FIGS. 2-3, RWA rotor 14 includes a rotor shaft 40, a rotor rim 42, and a disc-shaped intervening structure or "suspension web" 44 joining rotor rim 42 to rotor shaft 40. When RWA 10 is assembled, rotor shaft 40 projects through an opening provided in centralized bearing containment structure 30 and extends into central bearing compartment 34. Rotor shaft 40 and centralized bearing containment structure 30 are sized such that the majority of rotor shaft 40, and perhaps the substantial entirety thereof, is contained within central bearing compartment 34. Rotor rim 42, by comparison, is partially received within annular recess 36 (FIG. 3) and circumscribes inner tubular sidewall 32. In the illustrated example, rotor rim 42 is contained within a rotor cavity 45 (identified in FIG. 3), which is defined by primary support platform 18 and rotor cover 22 when RWA 10 is assembled. As taken along spin axis 16, rotor rim 42 may extend along the majority of centralized bearing containment structure 30. Finally, the spacecraft mounting interface of RWA 10 (defined by radially-extending tabs 47 provided around outer annular sidewall 38 of support platform 18 in the illustrated example) may extend around bearing containment structure 30. In further embodiments, the particular geometry, construction, and disposition of RWA rotor 14 may vary, providing that rotor 14 includes at least one inertial element (e.g., rotor rim 42) fixedly joined to a shaft (e.g., shaft 40) coaxial with spin axis 16.

RWA 10 further includes a generally annular spin motor 46, which is mounted within rotor cavity 45 (FIG. 3) and largely nested or contained within RWA rotor 14. Taken radially, spin motor 46 is located between rotor rim 42 and inner tubular sidewall 32 of centralized bearing containment structure 30; that is, spin motor 46 is located inboard of rotor rim 42 and outboard of tubular sidewall 32. Spin motor 46 includes an inner motor stator 48 and an outer motor rotor 50, which circumscribes stator 48. Inner motor stator 48 has a generally annular geometry and is affixed to primary support platform 18. In particular, motor stator 48 is bolted or otherwise attached to annular mounting interface extending around centralized bearing containment structure 30. Similarly, outer rotor 50 also has a generally annular geometry, but is affixed to and extends around the interior of rotor rim 42. Spin motor 46 can take any form suitable for driving rotation of rotor 14 about spin axis 16. In the illustrated embodiment, and by way of non-limiting example only, spin motor 46 is an ironless armature electric motor. Accordingly, inner motor stator may assume the form of a Printed Circuit Board (PCB) or other resin-filled body in which an annular array of electromagnetic coils is embedded. When energized, the electromagnetic coils interact with non-illustrated permanent magnets and, perhaps, pole pieces included within outer motor rotor 50 and spaced about the interior of rotor rim 42 to drive rotation of RWA rotor 14 about spin axis 16.

As previously described, spin motor 46 is largely or wholly nested within RWA rotor 14. Similarly, centralized bearing containment structure 30 is generally nested or contained within spin motor 46. Such a highly nested motor-rotor-bearing design provides several advantages. First, by nesting spin motor 46 within RWA rotor 14, the axial dimension of RWA 10 (the dimension of RWA 10 taken along spin axis 16) can be further reduced. Second, such a highly nested design enables outer rotor 50 of spin motor 46 and rotor rim 42 to collectively form a single inertial system during rotation of RWA rotor 14. Inertial system 42, 50 has a Center of Gravity ("$CG_{SYSTEM}$"), which is represented in FIG. 3 by CG symbol 52. $CG_{SYSTEM}$ may or may not overlap or coincide with the center of gravity of rotor 14 ("$CG_{ROTOR}$"), as considered in isolation. However, for the purposes of the present example and the following description, $CG_{SYSTEM}$ and $CG_{ROTOR}$ are considered to substantially coincide and to be jointly represented by CG symbol 52 (FIG. 3). As indicated in FIG. 3, $CG_{SYSTEM}$ and $CG_{ROTOR}$ (symbol 52) may be located at or adjacent the center point of small scale RWA 10. However, $CG_{SYSTEM}$ and $CG_{ROTOR}$ (symbol 52) need not be located at the precise center of RWA 10 and, instead, may be shifted slightly in an axial direction from the center of RWA 10 by design. Generally, $CG_{SYSTEM}$ and $CG_{ROTOR}$ (symbol 52) will typically be located within bearing containment structure 30 and circumscribed by duplex bearing pair 54 (described below). Additionally, $CG_{SYSTEM}$ and $CG_{ROTOR}$ (symbol 52) will typically be located closer to a midline plane extending through the center of RWA 10 and orthogonal to spin axis 16 (FIG. 3) than to either end of RWA 10, as taking along axis 16.

In the exemplary embodiment of FIGS. 1-3, and referring specifically to FIGS. 2-3, small scale RWA 10 further contains a duplex bearing pair 54. Duplex bearing pair 54 is contained within centralized bearing containment structure 30 and disposed around an intermediate portion of rotor shaft 40. More specifically, duplex bearing pair 54 is disposed between and matingly engages an outer circumferential surface of rotor shaft 40 and an inner circumferential surface of inner tubular sidewall 32 included within bearing containment structure 30. Duplex bearing pair 54 facilitates rotation of rotor 14 about spin axis 16 relative to housing assembly 12 and the other static components of RWA 10. As briefly noted above, $CG_{SYSTEM}$ and $CG_{ROTOR}$ (symbol 52 in FIG. 3) may be located within or circumscribed by duplex bearing pair 54. For reasons that will be explained more fully below, a face-to-face or "DF" duplex bearing is advantageously selected for usage as pair duplex bearing pair 54. As appearing herein, the term "DF" duplex bearing pair refers to a pair of rolling element bearings that are positioned such that the bearing load lines of the two bearing rows converge when moving toward spin axis 16 (FIGS. 3 and 4) and the duplex bearing pair is assembled. DF duplex bearing pairs should be contrasted with other types of bearing pairs, such as back-to-back (DB) bearing pairs (in which the bearing load lines separate when moving toward the spin axis) and tandem (DT) bearing pairs, which do not share this characteristic.

Figure 4:
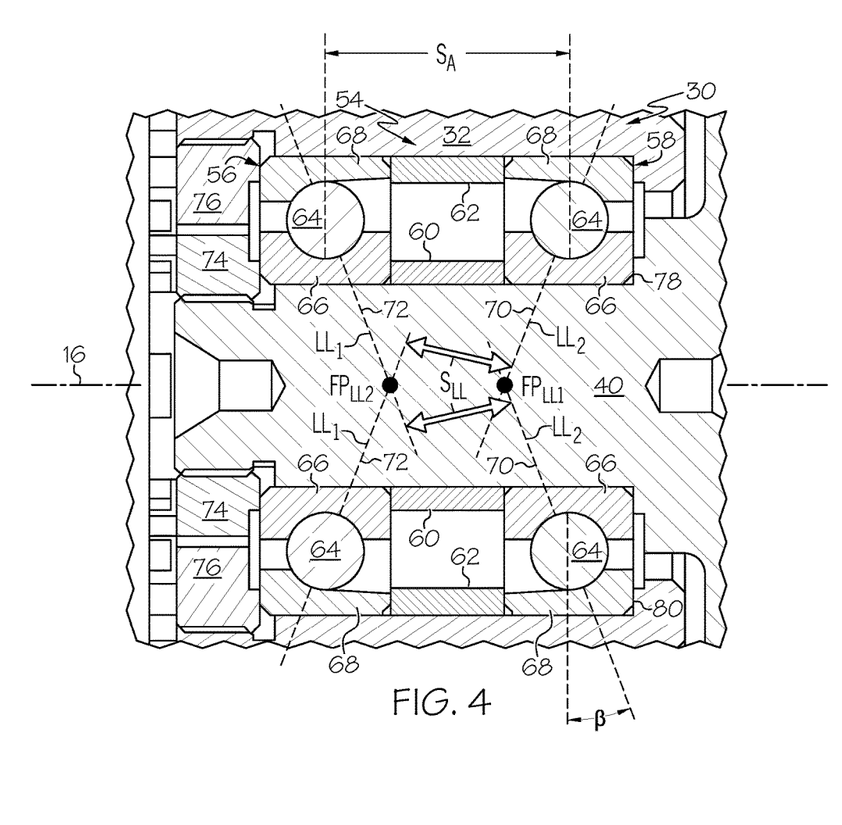
FIG. 4 is a detailed cross-sectional view of the centralized bearing arrangement contained within the small scale RWA shown in FIGS. 1-3, which includes a split or axially-expanded face-to-face (DF) duplex bearing pair and which is further illustrated in accordance with an exemplary embodiment of the present invention.

FIG. 4 is a detailed cross-sectional view of the centralized bearing arrangement, which is contained within small scale RWA 10 and which illustrates DF duplex bearing pair 54 in greater detail. In this drawing figure, it can be seen that DF duplex bearing pair 54 contains a first rolling element bearing 56, a second rolling element bearing 58, an inner ring spacer 60, and an outer ring spacer 62. Rolling element bearings 56, 58 each include, in turn, a plurality of rolling elements 64 distributed around the rotational axis of bearing pair 54. Each rolling element bearing 56, 58 further includes an inner ring 66 and a concentric outer ring 68, which capture rolling elements 64 therebetween. Rolling elements 64 are balls or spheres in the illustrated example, but can be another type of rolling element (e.g., cylinders) in further embodiments. Additionally, in further embodiments, inner ring 66 of rolling element bearing 56 and/or of rolling element bearing 58 may be integrally formed with inner ring spacer 60 as a single piece to further reduce part count. Similarly, in such embodiments, outer ring 68 of rolling element bearing 56 and/or of rolling element bearing 58 may be integrally formed with outer ring spacer 62 as a single piece. DF duplex bearing pair 54 can assume other forms and include other features (e.g., retainers or cages) in further embodiments, providing that bearing pair 54 includes two rolling element bearings that, when properly preloaded, are placed in a face-to-face relationship, as described more fully below.

As represented in FIG. 4 by dashed line 72, rolling element bearing 56 has a first bearing load line ($LL_1$). Similarly, rolling element bearing 58 has a second bearing load line ($LL_2$) represented by dashed line 70. The angular orientation of bearing load lines ($LL_{1-2}$) are defined by the contact angle (β) formed between rolling elements 64 and the raceways of each bearing 56, 58 when duplex bearing pair 30 is assembled and any desired preloads are applied thereto. For example, as indicated in the bottom left corner of FIG. 4, load line 70 is defined by the contact angle (β) between rolling elements 64 of bearing 58 and the races provided around inner and outer rings 66, 68. Although not specifically labeled in FIG. 4, it will be appreciated that the contact angle setting the orientation load line 72 is established in a like manner. The bearing load lines of the two bearings converge on the rotational axis of duplex bearing pair 54 and, therefore, spin axis 16 of rotor 14. Additionally, as duplex bearing pair 54 is a face-to-face or "DF" bearing pair, the bearing load lines of rolling element bearings 56, 58 extend inwardly toward the interior of duplex bearing pair 54, as taken along spin axis 16. In the illustrated example, rolling element bearings 56, 58 may thus be considered mirror opposites, which are opposed about a plane of symmetry that passes through a central portion of RWA 10 and possibly transects $CG_{ROTOR}$. Stated differently, rolling element bearings 56, 68 may be substantially equidistant from a plane orthogonal to spin axis 16 and transecting $CG_{ROTOR}$.

For the reasons explained above, duplex bearing pair 54 is properly considered a face-to-face or "DF" bearing pair with the bearing load lines or vectors of rolling element bearings 56, 58 extending inwardly toward the center of the bearing envelope. Additionally, bearing pair 54 is axially-expanded or split as the two row of rolling elements 64 are separated by a predetermined axial spacing ($S_A$), as taken along spin axis 16. Notably, the bearing load lines ($LL_{1-2}$) represented by dashed lines 70, 72 are offset or spaced by bearing load line separation ($S_{LL}$). The bearing load line separation ($S_{LL}$) is determined by the geometry of duplex bearing pair 54 and, specifically, by the duplex pair bearing spacing ($S_A$) and the rolling element/raceway contact angle (β). In illustrated embodiment, rolling element bearings 56, 58 may be obtained from a supplier as a duplex bearing pair, which are intended to be positioned in intimate contact. The desired bearing load line separation ($S_{LL}$), in this particular case, may be created by retrofitting the duplex bearing pair with ring spacers 60 and 62, which provide a desired axial standoff between inner and outer rings 66, 68 of bearings 56, 68. In further embodiments, the desired bearing load line separation ($S_{LL}$) elements 64 of bearings 56, 68 can be achieved by adjusting the rolling element/race contact angle (β) in addition to or in lieu of the duplex pair bearing spacing ($S_A$). For example, such an axial spacing can also be achieved in further embodiments by otherwise axially spreading the angled contact surfaces of bearings 56, 58 by, for example, producing a single, axially-elongated outer ring to replace outer rings 68 and outer spacer 62 and/or by producing a single, appropriately-sized inner ring to replace inner rings 66 and inner spacer 60. In one embodiment wherein rotor shaft 40 has a length $L_{SHAFT}$ as taken along spin axis 16 and axially-expanded DF duplex bearing pair 30 has a length $L_{BEARING}$ as taken along spin axis 16, the length of bearing pair 30 is greater than half the length of rotor shaft 40 such that $L_{BEARING} > 0.5\ L_{SHAFT}$.

The usage of a non-spaced DF duplex bearing pair within the centralized bearing architecture of RWA 10, however, can present technical challenges relating to rotor stability and the momentum capacity of RWA 10. Specifically, it has been determined that the usage of a non-spaced DF duplex bearing pair within the centralized bearing architecture of RWA 10 provides, in essence, a single point at which the bearing load lines converge on rotor shaft 40. In a dynamic (e.g., launch) environment wherein significant off-axis forces are applied to RWA 10 and RWA rotor 14, undesirable rotation of rotor 14 along axes orthogonal to spin axis 16 can consequently occur. This is typically not a concern in the context of traditional or legacy RWA designs, which include two duplex bearing pairs positioned at opposing ends of the rotor shaft. However, in the context of the centralized bearing architecture of RWA 10, off-axis rotor motion or "wobble" is a significant concern, especially as RWA rotor 14 increases in size and mass. The solution to this technical problem is, at least in part, realized by imparting DF duplex bearing pair 54 with axially-expanded configuration contained within a relatively compact, centralized single bearing architecture. By imparting DF duplex bearing pair 54 with an axially-expanded configuration, rotor stiffness and moment capacity are increased to levels adequate to satisfy the mission requirements of RWA 10, while still allowing the usage of a single DF duplex bearing pair to support rotor 14.

It will be appreciated that the bearing load line separation (SLL) of DF duplex bearing pair 54 is a tunable parameter, which can be adjusted in relation to any number of factors, such as the mass of RWA rotor 14 and the environmental parameters (e.g., magnitude of vibrations and random disturbance forces) small scale RWA 10 is required to survive to satisfy its mission requirements. Generally, increasing the bearing load line separation (SLL) of DF duplex bearing pair 54 will boost the moment capacity of RWA 10, albeit with the potential penalty of a slight increase in the overall axial dimension of the RWA envelope. Thus, the bearing load line separation (SLL) of axially-expanded DF duplex bearing pair 54 will typically be scaled upwardly as rotor mass increases and/or as the magnitude of the disturbance forces to which RWA 10 may be subjected become more severe. When RWA 10 is deployed onboard a small satellite, SLL is ideally chosen to be relatively small to minimize overall RWA dimensions and weight, while also being sufficiently large to provide stiffness and moment capacity characteristics sufficient to allow RWA 10 to tolerate (without structural damage) the impact, random disturbance force launch environment encountered when delivering RWA 10 and its host satellite into orbit. Additionally, in certain embodiments, the load line separation (SLL) can be tailored to provide a desired angular stiffness to, for example, set a first rotor angular mode frequency in a manner minimizing undesired rotor motions due to bearing excitations occurring during RWA operation.

Rolling element bearings 56, 58 can be retained within centralized bearing containment structure 30 in a number of different manners, providing that a controlled axial preload is applied to inner rings 66 and to outer rings 68 of bearings 56, 58. In the illustrated example, inner and outer clamp nuts 74 and 76 are contained within inner cavity 34 and utilized to secure rolling element bearings to rotor shaft 40 and bearing containment structure 30, respectively. As can be seen most readily in FIG. 4, inner clamp nut 74 is threaded onto an externally-threaded end portion of rotor shaft 40. As inner clamp nut 74 is tightened, clamp nut 74 exerts an axial force on inner ring 66 of rolling element bearing 58, which is transmitted through inner spacer 60, and to inner ring 66 of rolling element bearing 66. Inner ring 66 of rolling element bearing 66 abuts a circumferential ledge or shelf 78 included in RWA rotor 14 around the base of shaft 40. As a result, the interior portions of duplex bearing pair 54 are captured between inner clamp nut 74 and shelf 78, while a controlled axial preload is imparted across inner rings 66. Similarly, outer clamp nut 76 is threaded into an internally-threaded portion of inner wall 32 included within bearing containment structure 30. Outer clamp nut 76 abuts outer ring 68 of rolling element bearing 58, which is transmitted through outer spacer 62, and to outer ring 68 of rolling element bearing 56. Outer ring 68 of rolling element bearing 64 abuts a circumferential lip 80, which projects inwardly from outer tubular sidewall 32 of bearing containment structure 30. In this manner, the exterior portions of duplex bearing pair 54 are captured between outer clamp nut 76 and circumferential lip 80, while a desired axial preload is applied across outer rings 68.

There has thus been provided embodiments of small scale RWA including a centralized bearing architecture, which contains a single, axially-expanded DF duplex bearing pair disposed around an intermediate portion of the rotor's shaft. The DF duplex bearing pair contains first and second rolling element (e.g., ball) bearings, which each have a bearing load line. The bearing load lines may be separated by a spacing or separation ($S_{LL}$), as determined by the axial spacing ($S_A$) between the rolling element rows of the bearings and the contact angles ($\beta$) of the bearings. In this manner, the bearing load line separation ($S_{LL}$) may be tailored to impart the RWA with increased rotor stability and moment capabilities. As a result, the small scale RWA may better accommodate off-axis disturbance forces and provide optimized dynamic performance, while utilizing a single duplex bearing to support the RWA rotor. More generally, the part count, weight, size, and production costs of the small scale RWA is favorably reduced as a result of such a simplified, centralized bearing architecture. The reliability of the RWA is also enhanced by eliminating possible failure point in the form of a second duplex bearing pair. Still further features that may contribute to the lightweight, axially-compact design of the small scale RWA in at least some embodiments include a highly nested design wherein the axially-expanded duplex bearing pair is at partially nested within the spin motor, which is at least partially nested within the rotor. The small scale RWA is consequently well-suited for usage onboard small satellites, but is not limited to deployment onboard any particular vehicle or platform.

Embodiments of the small scale RWA leverage provide a reduced product architectural response through a highly functional component integration and a modified bearing suspension. In contrast to other RWA architectures relying upon two duplex bearing pairs, the bearing suspension may incorporate and consist of a single duplex bearing pair. A single duplex bearing pair is thus utilized to manage the rotor inertia demands defined by the mission requirements of the RWA. Stated differently, the small scale RWA may include a rotor suspension system that contains only or consists of a single duplex bearing pair. An axially-expanded DF duplex bearing pair is incorporated into the RWA in an axially-spread configuration, which separates its duplex halves by an axial spacing sufficient to support multi-axis loading demands of the type generated in a dynamically-imposed environment; e.g., impact or vibration forces generated during satellite launch. Combined with a dynamically-tuned RWA structure, the axially-expanded duplex bearing pair allows mechanical loads to be properly managed within the RWA. Such an alternate bearing configuration and RWA architecture can dramatically reduce production costs and assembly time for higher volume commercial production.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A reaction wheel assembly, comprising:
    a primary support platform;
    a rotor having a rotor shaft and a rotor rim fixedly coupled thereto, the rotor coupled to the primary support platform for rotation about a spin axis;
    an axially-expanded face-to-face (DF) duplex bearing pair disposed between the rotor shaft and the primary support platform, the axially-expanded DF duplex bearing pair comprising:
        a first rolling element bearing positioned around the rotor shaft and having a first bearing load line; and
        a second rolling element bearing positioned around the rotor shaft and having a second bearing load line separated from the first bearing load line by a bearing load line separation ($_{SLL}$); and
    a spin motor disposed at least partially between the rotor shaft and the rotor rim, the spin motor comprising:
        a motor stator disposed around the rotor shaft and fixedly coupled to the primary support platform; and
        an annular motor rotor mounted to an inner circumferential portion of the rotor rim.

2. The reaction wheel assembly of claim 1 wherein the axially-expanded DF duplex bearing pair is at least partially nested within the rotor.

3. The reaction wheel assembly of claim 1 wherein the rotor has a center of gravity ($CG_{ROTOR}$), wherein the first rolling element bearing contains a first plurality of rolling elements located on a first side of a plane orthogonal to the spin axis and transecting $CG_{ROTOR}$, and wherein the second rolling element bearing contains a second plurality of rolling elements located on a second opposing side of the plane orthogonal to the spin axis and transecting $CG_{ROTOR}$.

4. The reaction wheel assembly of claim 3 wherein the first rolling element bearing and the second rolling element bearing are located adjacent and substantially equidistant from the plane orthogonal to the spin axis and transecting $CG_{ROTOR}$.

5. The reaction wheel assembly of claim 1 wherein the first rolling element bearing contains a first plurality of rolling elements, wherein the second rolling element bearing contains a second plurality of rolling elements, and wherein the rotor comprises a rotor rim fixedly coupled to the rotor shaft and circumscribing the first plurality of rolling elements and the second plurality of rolling elements.

6. The reaction wheel assembly of claim 1 wherein the annular motor rotor and the rotor rim combine to yield an annular inertial system having a center of gravity ($CG_{SYSTEM}$) on which the first and second bearing load lines converge.

7. The reaction wheel assembly of claim 1 wherein the primary support platform comprises:
   a radially-extending wall;
   a tubular central structure projecting from the radially-extending wall in an axial direction; and
   an inner cylindrical cavity provided within the tubular central structure, housing the axially-expanded DF duplex bearing pair, and into which the rotor shaft extends.

8. The reaction wheel assembly of claim 7 wherein the axially-expanded DF duplex bearing pair mates to an outer circumferential surface of the rotor shaft and an inner circumferential surface of the tubular central structure defining the inner cylindrical cavity.

9. The reaction wheel assembly of claim 8 further comprising inner and outer clamp nuts securing inner and outer portions of the DF duplex bearing pair to the rotor shaft and to the tubular central structure, respectively, the inner and outer clamp nuts at least partially contained within the inner cylindrical cavity.

10. The reaction wheel assembly of claim 1 wherein the rotor shaft has a length $L_{SHAFT}$ as taken along the spin axis, wherein the axially-expanded DF duplex bearing pair has a length $L_{BEARING}$ as taken along the spin axis, and wherein $L_{BEARING} > 0.5\, L_{SHAFT}$.

11. The reaction wheel assembly of claim 1 further comprising a centralized bearing containment structure fixedly coupled to the primary support platform and containing the axially-expanded DF duplex bearing pair;
   wherein the spin motor is nested within the rotor, while the centralized bearing containment structure is nested within the spin motor.

12. The reaction wheel assembly of claim 1 wherein the axially-expanded DF duplex bearing pair is the only bearing pair contained in the reaction wheel assembly and supporting the rotor.

13. The reaction wheel assembly of claim 1 wherein the rotor has a center of gravity ($CG_{ROTOR}$) contained within the axially-expanded DF duplex bearing pair.

14. A reaction wheel assembly, comprising:
   a housing assembly;
   a rotor having a rotor shaft having a shaft length, a rotor rim, and a center of gravity ($CG_{ROTOR}$), the rotor coupled to the housing assembly for rotation about a spin axis; and
   a rotor suspension system supporting the rotor within the housing assembly;
   wherein the rotor suspension system contains only a single bearing pair; and
   wherein the single bearing pair comprises a face-to-face (DF) duplex bearing pair disposed around the rotor shaft, extending at least one half of the shaft length, and circumscribing $CG_{ROTOR}$.

15. The reaction wheel assembly of claim 14 wherein the housing assembly comprises a central tubular structure containing the DF duplex bearing pair and into which the rotor shaft extends.

16. The reaction wheel assembly of claim 15 wherein the rotor rim circumscribes at least a portion of the central tubular structure and the DF duplex bearing pair.

17. The reaction wheel assembly of claim 14 wherein the DF duplex bearing pair comprises:
   a first rolling element bearing positioned around an intermediate portion of the rotor shaft and having a first bearing load line; and
   a second rolling element bearing position around the intermediate portion of the rotor shaft and having a second bearing load spaced from the first bearing load line by a bearing load line separation ($S_{LL}$).

18. A reaction wheel assembly, comprising:
   a primary support platform including an inner tubular sidewall defining a central chamber;
   a rotor mounted to the primary support platform for rotation about a spin axis, the rotor comprising:
      a rotor rim circumscribing the inner tubular sidewall; and
      a rotor shaft joined to the rotor rim and extending into the central chamber; and
   a face-to-face (DF) duplex bearing pair disposed between the rotor shaft and the inner tubular sidewall and retained within the central chamber;
   wherein the rotor rim and the motor rotor collectively form an inertial system having a center of gravity $CG_{SYSTEM}$ contained within the DF duplex bearing pair.

19. The reaction wheel assembly of claim 18 further comprising a spin motor at least partially nested within the rotor, the spin motor comprising:
   a motor rotor mounted to an interior portion of the rotor rim; and
   a motor stator mounted to the primary support platform.

* * * * *